Dec. 12, 1967

V. E. BENES 3,358,269

SQUARE SWITCH DISTRIBUTION NETWORK EMPLOYING A MINIMAL NUMBER OF CROSSPOINTS

Filed April 10, 1964

3 Sheets-Sheet 1

INVENTOR
V. E. BENES
BY Lucian C. Canepa
ATTORNEY

Dec. 12, 1967 V. E. BENES 3,358,269

SQUARE SWITCH DISTRIBUTION NETWORK EMPLOYING
A MINIMAL NUMBER OF CROSSPOINTS

Filed April 10, 1964 3 Sheets-Sheet 2

United States Patent Office 3,358,269
Patented Dec. 12, 1967

3,358,269
SQUARE SWITCH DISTRIBUTION NETWORK EMPLOYING A MINIMAL NUMBER OF CROSSPOINTS

Vaclav E. Benes, Chester, N.J., assignor to Bell Telephone Laboratories, Incorporated, New York, N.Y., a corporation of New York Filed Apr. 10, 1964, Ser. No. 358,712
9 Claims. (Cl. 340—166)

ABSTRACT OF THE DISCLOSURE

A rearrangeable symmetrical distribution network is disclosed for connecting any one of N input terminals to any one of N output terminals where N is any positive integer such that $2^{\alpha_2}\cdot 3^{\alpha_3}\ldots k^{\alpha_k}$ is the prime decomposition of N into a product of prime numbers raised to integer exponents. The network includes $$2\left(\sum_{j=2}^{k}\alpha_j\right)-1$$

Figure 1A:
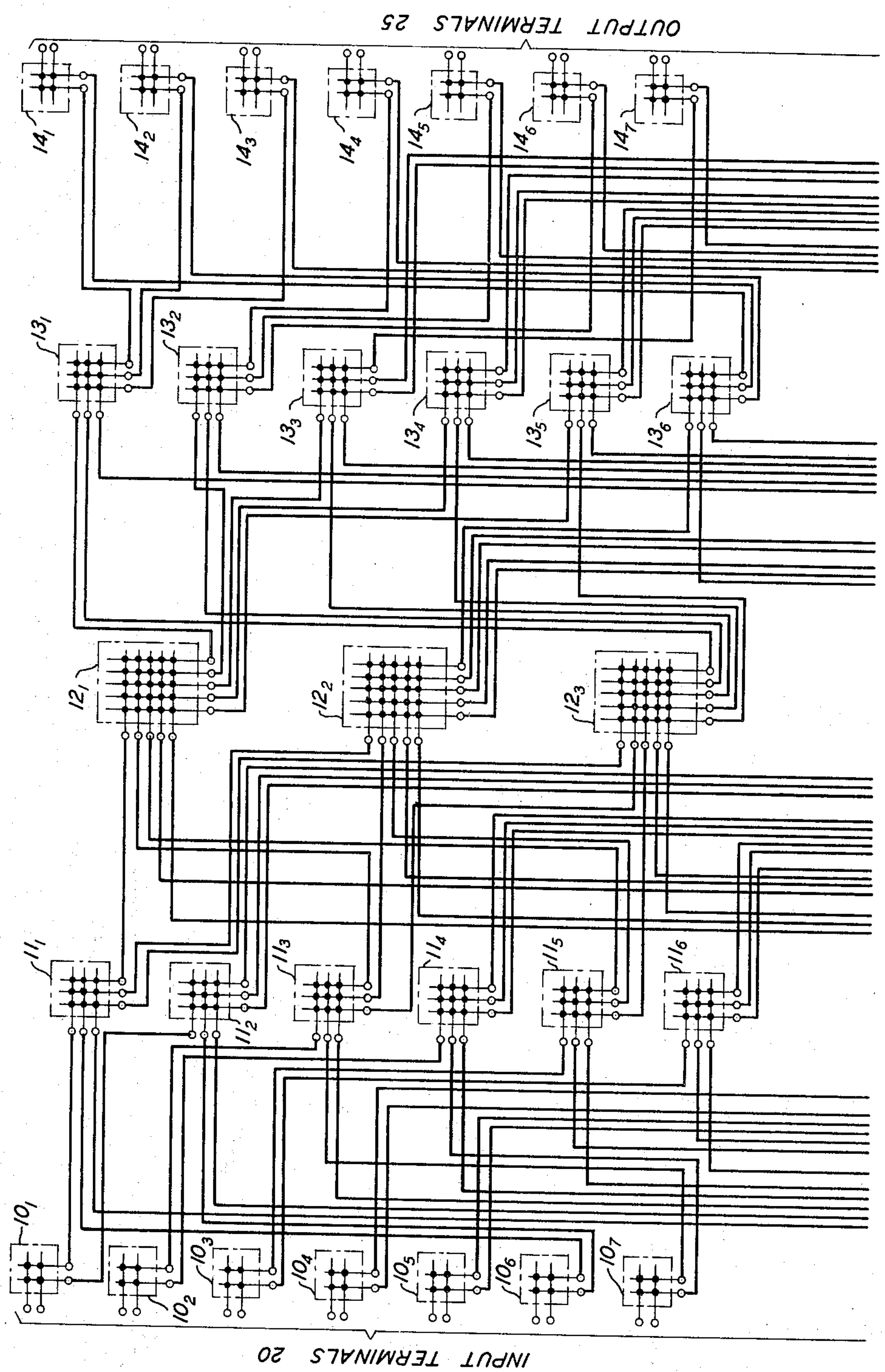

interconnected stages if the largest prime factor of N exceeds three or if it equals three and N is odd, or $$2\left(\sum_{j=2}^{k}\alpha_j\right)-3$$

interconnected stages if the largest prime factor of N equals two or if it equals three and N is even. Each stage includes a plurality of square switches of like size. The number of inputs and outputs of each stage equals N.

This invention relates to switching circuits and, more specifically, to a distribution switching networb employing a minimal number of crosspoint contact pairs.

Pursuant to relatively recent innovations in the electronic and magnetic arts, much effort is currently being directed towards the development of economic telephone systems employing electronic switching principles. Such arrangements are inherently capable of faster operative speeds and increased flexibility than were prior telephone communication embodiments.

Experience with electronic telephone switching systems has indicated that the crosspoint switches found in signal distribution switching arrays included therein comprise a greater percentage of the over-all system cost than these circuit combinations did in older, electro-mechanical switching arrangements. Accordingly, electronic telephone systems require distribution networks comprising a minimal number of crosspoints. In addition, it is further desirable that such connecting networks be rearrangeable, i.e., allow each idle inlet to be connected to each idle outlet by rearranging the existing connection pattern. An illustrative rearrangeable network, along with common control equipment associated therewith, is disclosed in a copending application by M. C. Paull, Ser. No. 154,-477, filed Nov. 24, 1961 (now patent 3,129,407 issued Apr. 14, 1964). However, the above-described combination of features in a distribution connector, viz., rearrangeability and a crosspoint minimum, are in general conflicting, and have therefore not been embodied in prior art switching structures.

It is thus an object of the present invention to provide an improved distribution switching network.

More specifically, an object of the present invention is the provision of an economical, rearrangeable distribution network which includes a minimum number of crosspoint switches.

It is another object of the present invention to provide a distribution connector which may easily and inexpensively be fabricated from a plurality of similar circuit combinations.

These and other objects of the present invention are realized in a specific, illustrative, rearrangeable symmetrical distribution connector which includes a minimum number of crosspoints for each input and output terminal connected thereto. The composite distribution network includes an odd number of stages each comprising a plurality of square switches of a like size.

Corresponding to N input and N output terminals, where N is any positive integer whose prime decomposition $2^{\alpha_3}\cdot 3^{\alpha_3}\ldots k^{\alpha_k}$ includes a prime factor greater than three or includes a prime factor equal to three and N is odd, the switching structure includes $$2\left(\sum_{j=2}^{k}\alpha_j\right)-1$$

stages. Where the largest prime factor of the prime decomposition of N is equal to three and N is even or where the largest prime factor is equal to two, the switching structure includes $$2\left(\sum_{j=2}^{k}\alpha_j\right)-3$$

stages. Each stage includes a plurality of square switches of like size. In the first situation mentioned above, the number of square switches included in each stage is derived by dividing N by a corresponding prime factor. In the second situation the number of square switches included in each stage except the middle stage is also derived by dividing N by a corresponding prime factor. The middle stage in this latter case includes either four or six square switches depending on the value of N.

The total number of crosspoints included in the instant connector is proportional to N log N, which compares favorably with the $N^2$ factor characterizing prior art square matrix switches.

It is thus a feature of the present invention that a distribution switch include a plurality of switching stages each comprising a plurality of like size, square switches.

It is another feature of the present invention that a distribution network comprise a like number of inlets and outlets, an odd number of symmetrically-connected switching stages each employing like-sized square switches, wherein the network comprises a minimum number of crosspoint contact pairs.

It is still another feature of the present invention that a symmetrical distribution network employing square switches comprise N input and N output terminals, and S switching stages serially connected between the input and output terminals, where $$S=\left(2\sum_{j=2}^{k}\alpha_j\right)-1$$

when the largest prime factor of the prime decomposition of N is greater than three or is equal to three and N is odd, and $$S=2\left(\sum_{j=2}^{k}\alpha_j\right)-3$$

when the largest prime factor of the prime decomposition of N is equal to two or is equal to three and N is even.

Figure 1B:
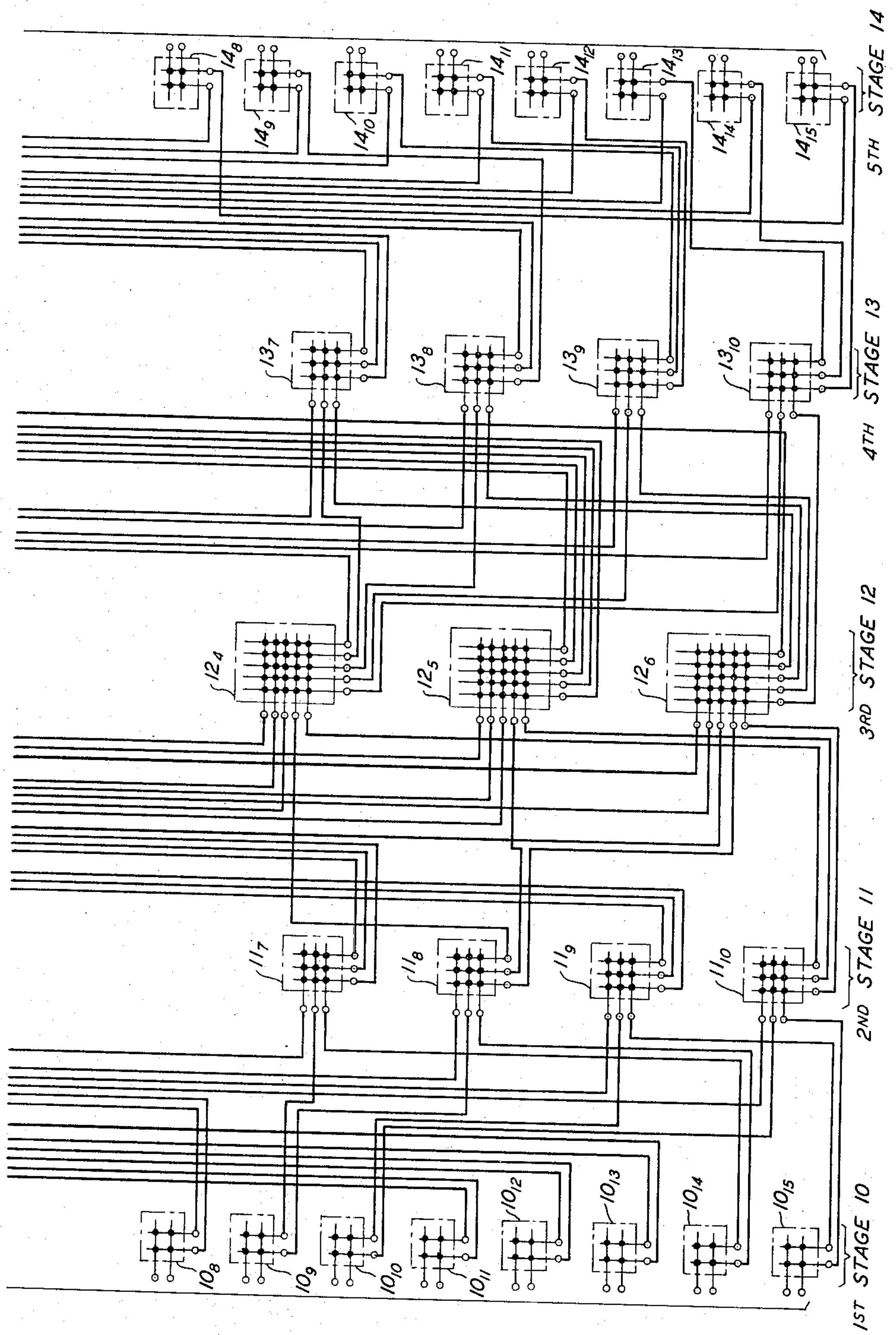
Figure 2:
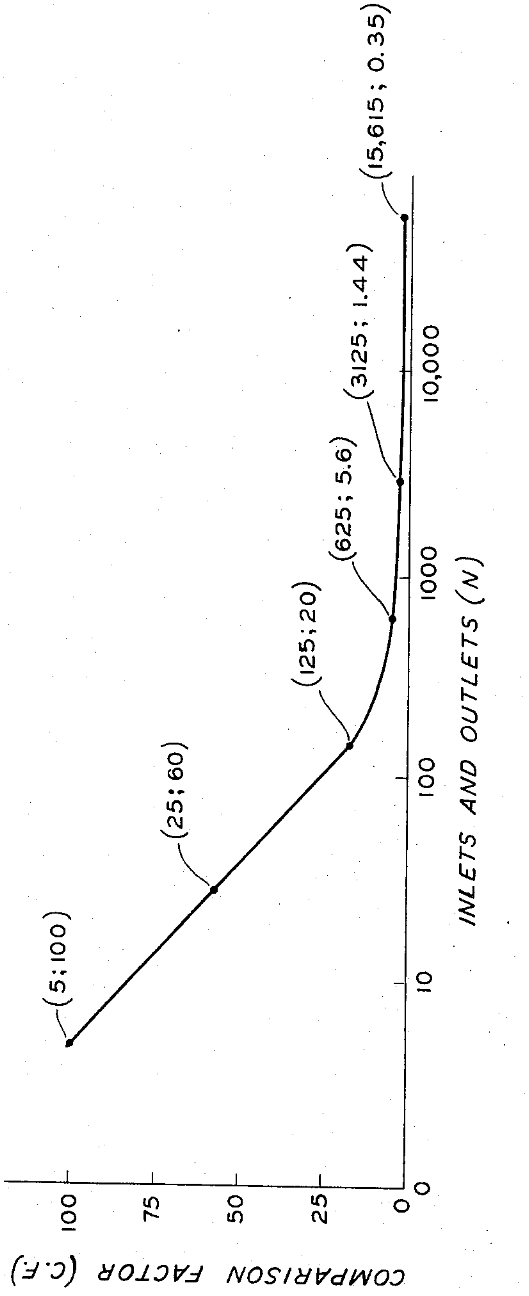

A complete understanding of the present invention and of the above and other features, advantages and variations thereof may be gained from a consideration of the following detailed description of an illustrative embodiment thereof presented hereinbelow in conjunction with the accompanying drawing, in which:

FIGS. 1(A) and 1(B) are schematic diagrams respectively illustrating the upper and lower halves of a distribution network which embodies the principles of the present invention; and FIG. 2 is a graph comparing the number of crosspoint switches employed in the instant class of distribution arrangements with the number of corresponding elements required in prior art square matrix embodiments.

As indicated above, it is considered important in the switching art to provide a rearrangeable distribution network which connects each of N input terminals, or inlets, to each of N output terminals, or outlets, and which employs a relatively small number of crosspoint switches. Accordingly, one aspect of the present invention is the provision of a distribution network which employs an absolute minimum number of crosspoints for the class of rearrangeable distribution connectors which comprise an odd number of serially-connected symmetrically-arranged switching stages each employing square switches. Each square switch, in turn, comprises a matrix array including a like number of inlets and outlets which are interconnected via a plurality of crosspoint switches. The crosspoint switches may advantageously comprise electronic devices, such as PNPN rectifiers or transistors, or electromechanical elements such as relays.

The over-all network is symmetrical to facilitate the fabrication thereof and also to simplify the associated common control circuit which may advantageously be of the type disclosed in the aforementioned Paull application. Further, the serially-connected switching stages include square switches to further facilitate the fabrication of the present distribution network.

*General network structure*

A distribution network constructed according to the principles of the present invention is exactly defined when the number of switching stages, the composition of each stage, and the interstage linkage patterns are specified. The former two criteria are dependent upon the particular value of N, corresponding to the N input and N output terminals to be interconnected by the composite distribution network. The precise nature of this dependence is given hereinbelow.

As is well known, every integer N has associated therewith a corresponding prime decomposition into a product of prime numbers each raised to an integer exponent. That is, for every integer N, there exists a sequence of prime factors 2, 3, 5, . . . $k$ such that $$N=2^{\alpha_2}\cdot 3^{\alpha_3}\cdot 5^{\alpha_5}\ldots k^{\alpha_k} \qquad (1)$$

where the $\alpha$ exponents may take on any integer value including zero. For example, the integer 126 has the prime decomposition.

$$126=2^1\cdot 3^2\cdot 5^0\cdot 7^1 \qquad (2)$$

Also, it is well known that there is only one, unique prime decomposition for any particular integer.

With the above in mind, a distribution network embodying N inlets and N outlets is derived as follows. The case where the number of switching stages S is given by $$S=\left(2\sum_{j=2}^{k}\alpha_j\right)-1 \qquad (3)$$

will be considered. In this case, the central switching stage includes $N/k$ square switches each comprising $k$ inlets and outlets. The remaining switching stages are symmetrically distributed about the aforementioned central stage and comprise $N/f$ square switches each having $f$ inlets and outlets, where $f$ is the corresponding prime factor included in the prime decomposition of N. Each prime factor $f$ gives rise to 2 $\alpha_f$ switching stages, where $\alpha_f$ is the corresponding exponent of the prime factor $f$, with these switching stages being symmetrically connected on both sides of the central switching stage.

Adjacent ones of the serially-connected switching stages are interconnected in a repeating, overlapping manner. That is, a junctor connects the first outlet of the first (or top-most) switch includes in a left-hand switching stage with the first inlet of the first switch in the right-adjacent stage. The second outlet on the first switch of the left stage is joined with the first inlet of the second switch of the adjacent switching stage. This connection pattern continues until each switch of the right stage has one junctor connected thereto. At this point, the process starts over again with the first switch, continuing cyclically until all the junctors emanating from the left stage have been assigned.

It is noted that the above relationships define a complete distribution structure for any value of N. The structure embodying the above-described class of distribution networks, and the particular method of fabrication thereof, will become more clear from the discussion hereinafter of a particular, illustrative connector shown in FIG. 1, which succeeds a mathematical proof of crosspoint minimization.

*Proof of minimization*

The following proof demonstrates that the herein-presented class of distribution networks in fact employs an absolute minimum number of crosspoint switches for the above-described connector requirements, viz., and odd number of symmetrically-connected switching stages each including square switches of a like size.

SECTION 1.—PRELIMINARIES

The symbol $C_N$, $N\geq 2$, is used to denote the class of all connecting networks $\nu$ with the following properties:

(1) $\nu$ is two-sided, with N terminals on each side;

(2) $\nu$ is built of an odd number $s$ of stages $\delta_k$, $k$=v, . . . , of square switches, each stage having N inlets and N outlets;

(3) $\nu$ is symmetric in the sense that $\delta_k=\delta_{s-k+1}$ for $k=1, \ldots, \frac{1}{2}(s-1)$; and (4) Employing the notation $s=s(\nu)$=number of stages of $\nu$, $n_k=n_k(\nu)$=switch size in the $k^{th}$ stage of $\nu$, where $\nu$ has $N/n_k$ identical switches in the $k^{th}$ stage.

The defining conditions of $C_N$ imply that $$n_k=n_{s-k+1} \text{ for } k=1, \ldots, \frac{s-1}{2} \qquad (4)$$

and that $$\prod_{k=1}^{\frac{1}{2}(s+1)} n_k=N \qquad (5)$$

It is assumed throughout that $n_k(\nu)\geq 2$ for all $\nu$ and all $k=1, \ldots, s(\nu)$.

The cost per terminal (on a side) $c(\nu)$ of a network $\nu\epsilon C_N$ is defined to be the total number of crosspoints of $\nu$ divided by the number N of terminals on a side. Since there are $$\frac{N}{n_k}n_k x n_k$$

switches in stage $k$, the total number of crosspoints is (using the symmetry condition)

$$\sum_{k=1}^{S}\frac{N}{n_k}\cdot n_k^2=N\sum_{k=1}^{S}n_k=N\left(n_{1/2(s+1)}+2\sum_{k=0}^{\frac{1}{2}(s-1)}n_k\right) \qquad (6)$$

and so $$c(\nu)=n_{1/2(s+1)}+2\sum_{k=1}^{\frac{1}{2}(s-1)}n_k \qquad (7)$$

A network $\nu$ is called optimal if $$c(\nu)=\min\{c(\mu):\mu\epsilon C_N\} \qquad (8)$$

It is clear that the cost per terminal of a network $\nu\epsilon C_N$ depends only on the switch sizes, and not at all on the permutations that define the junctor patterns between stages.

Also, it may be observed that given any network $\nu_1 \epsilon C_N$ there is another network $\nu_2 \epsilon C_N$ that is rearrangeable and differs from $\nu_1$ only in the fixed permutations that are used to connect the stages; in particular $\nu_1$ and $\nu_2$ have the same number of cross-points. Thus, the problem of selecting an optimal rearrangeable network from $C_N$ is equivalent to that of choosing an optimal network from $C_N$, rearrangeable or not. A network in $C_N$ can be made rearrangeable by changing its junctor patterns at no increase in cost.

Let

Definition 1:

$$m=m(\nu)=\frac{s(\nu)+1}{2}=\text{numerical index of the middle stage}$$

and $n=n(\nu)=n_m(\nu)=$size of middle stage switches.

Definition 2: $0(\nu)=\{n_1, \ldots, n_{m-1}\}$=the set of switch sizes (with repetitions) in outer (i.e., nonmiddle) stages.

Definition 3: $\omega(N)=\{0(\nu): \nu\epsilon C_N\}$.

Remark 1: $c(\nu)=n(\nu)+2\sum_{X\epsilon 0(\nu)} X$

Theorem 1: Let $(A,n)$ be a point (element) of $\omega(N)xX$ with $$n\prod_{y\epsilon A} y=N \tag{9}$$

Then there exists a nonempty set $Y \subseteq C_n$ $C_N$ such that $$T(\nu)=(A,n),\ \nu\epsilon Y \tag{10}$$

The $\nu$'s in Y differs only in the permutations between the stages, and in the placing of the outer stages, and at least one of them is rearrangeable. This result follows from the definition of $C_N$.

SECTION 2.—CONSTRUCTION OF THE BASIC PARTIAL ORDERING

The solution to the problem of synthesizing an optimal rearrangeable network from $C_N$ will be accomplished as follows: first define a mapping T of $C_N$ into $\omega(N)xX$, with $X=\{1, \ldots, N\}$, and a partial ordering $\leqq$ of $T(C_N)$; the map T will have the property that $c(\nu)$ is a function of $T(\nu)$; then prove that (roughly speaking) a network $\nu$ is optimal if and only if $T(\nu)$ is at the "bottom" of the partial ordering, i.e., that $c(\nu)$ is almost an isotone function of $T(\nu)$.

To define a partial ordering of a finite set, it is enough to specify consistently which elements cover which others. Let $Z, Z_0, Z_1, \ldots$ be sets of positive integers $\leqq N$ possibly containing repetitions.

Definition 4: $Z_1$ covers $Z_2$ if and only if there are positive integers $j$ and $k$ such that $k$ occurs in $Z_1$, $j$ divides $k$, and $Z_2$ is obtained from $Z_1$ by replacing an occurrence of $k$ with one occurrence each of $j$ and $k/j$.

Definition 5: $Z_0 \leqq Z$ if and only if there is an integer $n$ and sets $Z_1, Z_2, \ldots Z_n$ such that $Z_{i+1}$ covers $Z_i$, $i=0, 1, \ldots n-1$ and $Z_n=Z$.

Definition 6: T: $\nu \rightarrow 0(\nu), n(\nu)$

A partial ordering $\leqq$ of $T(C_N)$ is defined by the following definition of covering:

Definition 7: Let $\mu$, $\nu$ be elements of C(N) $T(\mu)$ covers $T(\nu)$ if and only if either i(i) $n(\nu)<n(\nu)$, $n(\nu)$ divides $n(\mu)$, and $0(\nu)$ results from $0(\mu)$ by adding an occurrence of $n(\mu)/n(\nu)$, or (ii) $n(\nu)=n(\mu)$ and $0(\mu)$ covers $0(\nu)$.

SECTION 3. COST IS NEARLY ISOTONE ON $T(C_N)$

Theorem 2: If $T(\nu) \leqq T(\mu)$, and $n(\mu)>6$, then $c(\nu) \leqq c(\mu)$.

Proof: It is enough to prove the result for $\mu$ and $\nu$ such that $T(\mu)$ covers $T(\nu)$.

Case (i): $n(\nu)<n(\mu)$, $n(\nu)$ divides $n(\mu)$, $n(\nu(\geqq 2$, and $0(\nu)$ results from $0(\mu)$ by adding an occurrence of $n(\mu)/n(\nu)$.

Then $$\begin{aligned}c(\nu)&=n(\nu)+2\sum_{x\epsilon 0(\mu)} x\\&=n(\nu)+\frac{2n(\mu)}{n(\nu)}+2\sum_{x\epsilon 0(\mu)} x\\&=c(\mu)+n(\nu)-n(\mu)+\frac{2n(\mu)}{n(\nu)}\\&=c(\mu)+n(\nu)\left[1-\frac{n(\mu)}{n(\nu)}\right]\frac{2n(\mu)}{n(\nu)}\end{aligned} \tag{11}$$

Thus $c(\nu) \leqq c(\mu)$ if and only if $$n(\nu)\left(1-\frac{n(\mu)}{n(\nu)}\right)+\frac{2n(\mu)}{n(\nu)} \leq 0 \tag{12}$$

that is if $$\frac{2y}{y-1} \leq x \tag{13}$$

where $x=n(\nu)$ and $y=n(\mu)/n(\nu)$. Now $n(\mu)>6$ implies that either (i) $$n(\nu)=2 \text{ and } \frac{n(\mu)}{n(\nu)} \geq 4$$

or (ii) $$n(\nu)=3 \text{ and } \frac{n(\mu)}{n(\nu)} \geq 3$$

or (iii) $$n(\nu) \geq 3$$

The condition $$\frac{2y}{y-1} \leq x$$

is fulfilled in all three cases, and so $c(\nu) \leqq c(\mu)$.

Case (ii): $n(\mu)=n(\nu)$ and $0(\mu)$ covers $0(\nu)$. There exist integers $j$, $k$ such that $j$ divides $k$, $j \geqq 2$ in $0(\mu)$, and $0(\nu)$ results from $0(\mu)$ by replacing one occurrence of $k$ with one each of $j$ and $k/j$. Then $$\begin{aligned}c(\nu)&=n(\nu)+2\sum_{x\epsilon 0(\nu)} x\\&=n(\mu)=2k+2j+\frac{2k}{j}+2\sum_{x\epsilon 0(\mu)} x\\&=c(\mu)-2k+2j+\frac{2k}{j}\end{aligned} \tag{14}$$

Since $j$ divides $k$ and $j \geqq 2$, $k \geqq 2j$ and $k \geqq 2k/j$, so $$k \geq 2 \max\left(j, \frac{k}{j}\right) > j+\frac{k}{j} \tag{15}$$

and $c(\nu)<c(\mu)$.

Theorem 3: If $\nu\epsilon C_N$ and $0(\nu)$ do not consist entirely of prime numbers (possibly repeated), then there exists a network $\mu$ in $C_N$ of $s(\nu)+2$ stages with $c(\mu)<c(\nu)$, and $\nu$ cannot be optimal in $C_N$.

Proof: There is a value of k in the range $1 \leqq k \leqq m(\nu)-1$ for which $n_k$ is not a prime, say $n_k=ab$. Replace the $k$th stage of 2 by two stages, one of $N/a$ $axa$ switches, the other of $N/b$ $bxb$ switches. Replace the $(s-k+1)$th stage of 2 by two stages, one of $N/b$ $bxb$ switches, the other of $N/a$ $axa$ switches. It is possible to interconnect these stages to give a symmetric network $\mu$ that is rearrangeable.

It is apparent that $n_{m(\mu)}=n_{m(\nu)}$ and that $0(\nu)$ covers $0(\mu)$. Hence, the argument for case (ii) of Theorem 2 shows that $\mu$ has strictly lower cost than $\nu$.

Corollary 1: If N>6 and is not prime, then a network $\nu$ consisting of one square switch is not optimal.

SECTION 4. PRINCIPAL RESULTS

Definition 8: An element $T(\nu)$ of $T(C_N)$ is ultimate if there are no $\mu\epsilon C_N$ such that $T(\nu)$ covers $T(\mu)$.

Remark 2: $T(\nu)$ is ultimate if and only if $n(\nu)$ is prime and $0(\nu)$ consists entirely of prime numbers.

Definition 9: An element $T(\nu)$ of $T(C_N)$ is penultimate if it covers an ultimate element.

Definition 10: $p_n$, $n=1,2,\ldots$, is the $n_{th}$ prime.

Definition 11: $\pi(n)$ is the prime decomposition of $n$, that is, the set of numbers (with repetitions) such that $$n=p_1^{\alpha_1}p_2^{\alpha_2}\ldots p_e^{\alpha_e} \qquad (16)$$

if and only if $\pi(n)$ contains exactly $\alpha_1$ occurrences of $p_i$, $i=1,\ldots,l$, and nothing else.

Definition 12: $p$ is the largest prime factor of N.

Lemma 1: If $p=3$ and $N>6$ is even, then the following conditions are equivalent:

(i) $\nu$ is optimal (ii) $T(\nu)$ is penultimate and $n(\nu)=6$, or 4

(iii)
$$T(\nu)=\left(\pi\left(\frac{N}{6}\right), 6\right) \text{ or } \left(\pi\left(\frac{N}{4}\right), 4\right)$$

if 4 divides N

Proof: By Theorems 2,3 only $\nu$ with $n(\nu)\leq 6$ and $°(\nu)$ consisting entirely of primes can be optimal. Writing $N=2^x3^y$ with $x\geq 1$ and $y\geq 1$, it is seen that such $\nu$ must have a cost $c(\nu)$ having one of the forms $2+2[2(x-l)+3y]=4x+6y-2$, $3+2[2x+3(y-l)]=4x+6y-3$, $4+2[2(x-2)+3y]=4x+6y-4$ (only occurs if $x>1$), $6+2[2(x-1)+3(y-1)]=4x+6y-4$.

The least of these is either of the last two, which correspond to $n(\nu)=6$ if $x=1$, or to $n(\nu)=6$ or 4 if $x>1$.

It is apparent that (ii) is equivalent to (iii).

Lemma 2: If $p=2$, and $N>4$, then the following conditions are equavalent:

(i) $\nu$ is optimal (ii) $T(\nu)$ is penultimate and $n(\nu)=4$ (iii) $T(\nu)=\pi\left(\frac{N}{4}\right), 4$ Proof: With $N=2^x$ it can be seen as in Lemma 1 that only those $\nu$ can be optimal whose cost $c(\nu)$ has one of the forms $$2+2[2(x-1)]$$
$$4+2[2(x-2)]$$

The second of these is the better, and corresponds to $n(\nu)=4$.

Theorem 4: Let $\mu$ be a network such that a prime humber $r>n(\mu)$ occurs in $0(\mu)$. Let M result from $0(\mu)$ by replacing one occurrence of $r$ by $n(\mu)$. Then for any network $\nu$ with $$T(\nu)=(M,r) \qquad (17)$$

it is true that $$c(\nu)<c(\mu) \qquad (18)$$

i.e., $\nu$ is strictly better than $\mu$. Among such $\nu$, that is best for which $r$ is largest.

Proof: Existence of a rearrangeable $\nu$ satisfying $$T(\nu)=(M,r)$$

is guaranteed by Theorem 1. For the rest of the proof, observe that $r>n(\mu)$ and $$c(\mu)=n(\mu)+2\sum_{x\epsilon 0(\mu)}x$$
$$=n(\mu)+2r-2n(\mu)+2\sum_{x\epsilon M}x$$
$$=r-n(\mu)+c(\nu) \qquad (19)$$

Theorem 5: If $n(\mu)\leq 6$, $n(\mu)=2^x3^y5^z$, some prime number $r>3$ occurs in $0(\mu)$, and if M results from $0(\mu)$ by replacing one occurrence of $r$ by $x$ occurrences of 2, $y$ occurrences of 3, and $z$ occurrences of 5 then for any network $\nu\epsilon C_N$ with $$T(\nu)=(M,r) \qquad (20)$$

it is true that $$c(\nu)\leq c(\mu) \qquad (21)$$

i.e., $\nu$ is at least as good as $\mu$. Among such $\nu$, that is best for which $r$ is largest.

Proof: Existence of a rearrangeable $\nu\epsilon C_N$ satisfying $T(\nu)=(M,p)$ is is given by Theorem 1. For the rest of the proof, we observe that $r\geq 5$ and $$c(\mu)=n(\mu)+2\sum_{u\epsilon 0(\mu)}u$$
$$=n(\mu)+2r-rx-6y-10z+2\sum_{u\epsilon M}u$$
$$=r+n(\mu)-4x-6y-10z+c(\nu) \qquad (22)$$

Since $x$, $y$, and $z$ can only assume the values 0 and 1, with $z=1$ if and only if $x=y=0$, we have $c(\mu)\geq c(\nu)$, the best $\nu$ corresponding to the largest $r$.

Definition 13:

$$Q=\left\{(A, r): r \text{ a prime and } A=\pi\left(\frac{N}{r}\right)\right\}$$

Definition 14: $L=T^{-1}(Q)$.

Remark 2: Q consists of all the absolute minima in the partial ordering $\leq$ of $T(C_N)$, i.e., $\nu\epsilon L$ implies that there are no $\mu\epsilon C_N$ for which $$T(\mu)<T(\nu) \qquad (23)$$

Theorem 6: If $p>3$, then all optimal networks belong to L.

Proof: Let $\mu\epsilon C_N-L$ be given. The following shows that there exists a $\nu\epsilon L$ that at least as good.

Case 1: There is a sequence $\mu=\mu_1, \mu_2, \ldots, \nu$ with $\mu_n\neq\nu$, $\nu\epsilon L$, $n(\mu_n)>6$ $$T(\mu_1)\geq T(\mu_2)\geq\ldots\geq T(\mu_n) \qquad (24)$$

and such that $T(\mu_1)$ covers $T(\nu)$. Then the numbers $n(\mu_j)$, $j=1,\ldots,n$ are all $>6$, and the result follows from Theorem 2.

Case 2: All sequences $\mu=\mu_1, \mu_2, \ldots, \mu_n, \nu$ with $\mu_n\neq\nu$, $\nu\epsilon L$, $T(\mu_1)\geq T(\mu_2)\geq\ldots\geq T(\mu_n)$, and such that $T(\mu_n)$ covers $T(\nu)$, are such that $n(\mu_n)\leq 6$. Consider such a sequence. Let $i$ be the smallest index $j$ for which $n(\mu_j)\leq 6$, $j=1,\ldots,n$. Then Theorem 2 gives $$c(\mu)\geq c(\mu_1)$$

Since $n(\mu_1)\leq 6$ and $T(\mu_n)$ covers $T(\nu)$, it follows that $0(\mu_1)$ contains an occurrence of $p>3$. Hence by Theorem 5 there exists a network $\eta\epsilon C_N$ with $n(\eta)=p$ and $$c(\eta)\leq c(\mu_1)\leq c(\mu) \qquad (25)$$

Let $\xi\epsilon L$ be such that $n(\xi)=p$ and $T(\eta)$ covers $T(\xi)$. Then $c(\xi)\leq c(\eta)$ by case (ii) of Theorem 2. Hence $$c(\xi)\leq c(\mu) \qquad (26)$$
$$\xi\epsilon L$$

Theorem 7: If $N\leq 6$ and $\nu$ is optimal, then $\nu$ is a square switch and $c(\nu)=N$.

Proof: For prime N with $2\leq N<6$ the result is patent. If $N=6$ and $\nu\epsilon C_6$ then exactly one of the following alternatives obtains:

$$T(\nu)=(\varphi, 6) \text{ and } c(\nu)=6$$
$$T(\nu)=(\{3\}, 2) \text{ and } c(\nu)=8$$
$$T(\nu)=(\{2\}, 3) \text{ and } c(\nu)=7 \qquad (27)$$

The first alternative is optimal, and there is exactly one $\nu\epsilon C_6$ such that $T(\nu)=(\theta, 6)$, viz., the 6 x 6 square switch. Similarly, if $n=4$ and $\nu\epsilon C_4$, then $T(\nu)=(\theta, 4)$ or $(\{2\}, 2)$; the former has cost 4, the latter 6.

Definition 15: For $n\geq 2$, $D(\eta)$ is the sum of the prime divisors of $n$ counted according to their multiplicity; thus if $$n=2^{\alpha_1}3^{\alpha_2}\ldots p_k^{\alpha_k} \qquad (28)$$

then $$D(n)=\sum_{i=1}^{k} p_i\alpha_i = \sum_{X\epsilon\Pi(n)} X \quad (29)$$

Definition 16: $c(N)=\min\{c(\nu): \nu\epsilon C_N\}$

Theorem 8:

$$c(N)=\begin{cases} N \text{ if } N\leq 6 \text{ or } N \text{ is prime} \\ p+2D(N/p) \text{ if } N>6 \text{ and either } p>3 \text{ or } N \text{ is odd} \\ 2D(N/2) \text{ if } N>6 \text{ in all other cases (i.e., } p=2, \text{ or } p=3 \text{ and } N \text{ is even).} \end{cases} \quad (30)$$

Proof:

Putting together Lemmas 1, 2 and Theorems 1, 2, 3, 4, 6, and 7 we obtain the following values for the minimal cost in crosspoints per terminal on a side for networks in $C_N$:

$$c(N)=\begin{cases} N \text{ if } N\leq 6 \text{ or } N \text{ is prime} \\ p+2\sum_{X\epsilon\pi(N/p)} \quad \text{if } p>3,\ N>6 \\ 6+2\sum_{X\epsilon\pi(N/6)} x=2\sum_{X\epsilon\pi(N/2)} x \quad \text{if } p=3,\ N>6,\ N \text{ even} \\ 3+2\sum_{X\epsilon\pi(N/3)} x=3+6(\log_3 N-1) \quad \text{if } p=3,\ N>6,\ N \text{ odd} \\ 4+2\sum_{X\epsilon\pi(N/4)} x=4(\log_2 N-2)=2\sum_{X\epsilon\pi(N/2)} x \quad \text{if } p=2,\ N>6 \end{cases} \quad (31)$$

simplification gives Theorem 8.

Hence, it may be observed that the general circuit described hereinabove is an exact minimum for the herein-considered class of networks when N is greater than six.

*Specific example*

With the above general principles of network construction, and the associated proof of minimization described in detail above, a specific, illustrative distribution network will now be described. Referring to FIGS. 1(A) and 1(B), there is shown a distribution switching network which connects thirty input terminals 20 with each of thirty output terminals 25. Employing the general network structure described hereinabove, and letting $N=30$, we have the prime decomposition:

$$N=30=2^1\cdot 3^1\cdot 5^1 \quad (32)$$

Hence, the number of switching stages S is given by $$S=2\sum_{j=2}^{k}\alpha_j-1=2(1+1+1)-1=5 \quad (33)$$

wherein the five switching stages are denoted in FIGS. 1(A) and 1(B) by the reference numerals 10 through 14. The central switching stage 12 includes a plurality of square switches equal in size to the largest prime factor of 30. Hence, each of the switches in the central stage 12 includes a 5 x 15 array of crosspoint contact pairs, with each device being represented in FIGS. 1(A) and 1(B) by a heavy dot. The number of such square switches in the stage 12 is given by $N/5$, or 6. The six square switches comprising the third switching stage 12 are identified by the reference numeral $\mathbf{12}_1$ through $\mathbf{12}_6$, with the number 12 representing the switching stage, and the subscript symbolizing the particular square switch within the switching stage.

The next step in constructing the thirty inlet and outlet distribution network illustrated in FIGS. 1(A) and 1(B) is to choose another prime factor of 30, for Example 3. As illustrated in FIGS. 1(A) and 1(B), the second and fourth switching stages 11 and 13 each include $N/3$ or 10 switching stages each comprising a 3 x 3 array. Finally, the remaining prime factor 2 gives rise to the two remaining switching stages 10 and 14 which are symmetrically disposed about the central switching stage 12. The stages 10 and 14 each include $N/2$, or 15 square switches each comprising a 2 x 2 matrix array. It is noted that the thirty input terminals 20 correspond to the inlets of the first stage square switches $\mathbf{10}_1$ through $\mathbf{10}_{15}$, with the thirty output terminals corresponding to the outlets of the fifteen 2 x 2 square switches $\mathbf{14}_1$ through $\mathbf{14}_{15}$ which are included in the fifth switching stage 14.

With the switching structures described above, it remains only to specify the interstage linkage pattern. As indicated hereinabove, the junctors connecting adjacent switching stages are connected in the above-described overlapping manner. For example, examining the interconnections between the second and third switching stages 11 and 12, note that the junctors emanating from any particular square switch $\mathbf{11}_1$ through $\mathbf{11}_{10}$ are connected to the uppermost free terminals located on consecutive square switches $\mathbf{12}_1$ through $\mathbf{12}_6$ included in the third switching stage 12. More particularly note, for example, that the junctors emanating from the switch $\mathbf{11}_8$ are respectively connected to inlets of the third stage switches $\mathbf{12}_4$, $\mathbf{12}_5$ and $\mathbf{12}_6$. It is observed from the above that any particular value of N gives rise to a corresponding, rearrangeable distribution connector which, as indicated by the above proof, includes a minimum number of crosspoint switches. This connector may advantageously interconnect the N inlets and outlets in any desired pattern.

*Comparison with prior art connectors*

To more fully illustrate the significant crosspoint saving which may be effected by the teachings of the present invention, the number of contacts included in an illustrative member of the present class of distribution networks will now be compared with the number of similar elements included in prior art, square matrix arrays. Specifically, a comparison will be made for particular values of N given by $$N=5^m \quad (34)$$

where $m$ is any positive integer.

For such a network, the total number of crosspoints T is given by the product of the number of switching stages S multiplied by the number of crosspoints per switching stage C where $$S=[2(m)-1] \quad (35)$$

and $$C=N/5(5\times 5)=5N \quad (36)$$

Hence, $$T=[2m-1][5N] \quad (37)$$

But, since $$m=\log_5 N \quad (38)$$

then $$T=5N(2\log_5 N-1) \quad (39)$$

Hence, it is observed that the total number of contacts T varies as N log N. To compare the crosspoints T employed in the instant distribution switch, with the $N^2$ number of crosspoints employed in prior art square matrix arrays, let a comparison factor C.F., expressed as a percentage, be defined as $$\text{C.F.}=\frac{100\cdot 5N[2\log_5 N-1]}{N^2}=\frac{100N[10\log_5 N-5]}{N} \quad (40)$$

TABLE I

| N | m | 10 log₅N−5 | C.F. |
|---|---|---|---|
| 5 | 1 | 5 | 100 |
| 25 | 2 | 15 | 60 |
| 125 | 3 | 35 | 20 |
| 625 | 4 | 35 | 5.6 |
| 3,125 | 5 | 35 | 1.44 |
| 15,615 | 6 | 55 | .353 |

Table I, supra, illustrates the relationship between $m$, N, 10 $\log_5 N-5$, and C.F. for a range of values for $m$, with the comparison factor C.F. being illustrated in FIG. 2 in graphical form. Thus, for example, in a distribution connector comprising 625 inlets and outlets, the savings in the number of crosspoints required, along with the reduction in the associated cost of the connector fabrication, amounts to the extremely significant factor of 94.4%. In general, for the larger values of N commonly found in operative distribution connectors, the saving becomes proportionately larger, and exceeds 99% as N becomes greater than 3125.

Summarizing the basic concepts of the present invention, a rearrangeable distribution connector made in accordance therewith includes an odd number of stages each comprising a plurality of square switches of a like size. Corresponding to N input and output terminals, where N is any positive integer such that $2^{\alpha_2}\cdot 3^{\alpha_3}\ldots k^{\alpha_k}$ is the prime decomposition of N into a product of prime numbers raised to integer exponents, the composite distribution switch includes $$S=2\left(\sum_{j=2}^{k}\alpha_j\right)-1$$

stages if the largest prime factor of N exceeds three or if the largest prime factor equals three and N is odd, and includes $$S=2\left(\sum_{j=2}^{k}\alpha_j\right)-3$$

stages if the largest prime factor of N equals three and N is even or if the largest prime factor equals two. Where the number of stages is $$S=2\left(\sum_{j=2}^{k}\alpha_j\right)-1$$

the number of square switches included in each stage is derived by dividing N by a corresponding prime factor. Where the number of stages is $$S=2\left(\sum_{j=2}^{k}\alpha_j\right)-3$$

the number of square switches included in each stage other than the middle stage is also derived by dividing N by a corresponding prime factor. The number of switches included in the middle stage in the last case is determined as follows. When the largest prime factor of N is equal to two, the number of switches in the middle stage is $N/4$ (from Lemma 2). When the largest prime factor of N is equal to three and N is even, the number of switches in the middle stage is $N/4$ if N is divisible by four and $N/6$ otherwise (from Lemma 1).

The total number of crosspoints included in the instant connector is proportional to N log N, which compares favorably with the $N^2$ factor characterizing prior art square matrix switches.

It is to be understood that the above-described arrangements are only illustrative of the application of the principles of the present invention. Numerous other embodiments may be devised by those skilled in the art without departing from the spirit and scope of this invention. For example, while each crosspoint is represented in FIG. 1 as comprising a single contact pair, each of these switches could, in fact, comprise a plurality of ganged switching arrangements to provide simultaneous switching between tip, ring and sleeve telephone connectors.

Also, it is emphasized that although the instant distribution switch is believed to contain an absolute minimum number of crosspoints for the defined class of networks, the valuable savings effected in the number of crosspoints employed therein comprises a significant and worthwhile contribution to the art independent of the property of absolute minimization.

What is claimed is:

1. A symmetrical distribution network employing square switches comprising N input and N output terminals, where N is any positive integer such that $2^{\alpha_2}\cdot 3^{\alpha_3}\ldots k^{\alpha_k}$ is the prime decomposition of N into a product of prime factors raised to integer exponents, S switching stages serially connected between said input and output terminals, where S equals $$2\left(\sum_{j=2}^{k}\alpha_j\right)-1$$

if the largest prime factor of N equals three and N is odd or if the largest prime factor of N is greater than three, and equals $$2\left(\sum_{j=2}^{k}\alpha_j\right)-3$$

if the largest prime factor of N equals three and N is even or if the largest prime factor of N equals two, each of said switching stages including a plurality of square switches of equal size.

2. A combination as in claim 1 wherein each of said square switches comprise a plurality of inlets, a like plurality of outlets, and a plurality of switching means connecting each of said inlets to each of said outlets.

3. A combination as in claim 2 wherein the central switching stage comprises $N/k$ square switches if said largest prime factor equals three and N is odd or if said largest prime factor is greater than three, and comprises $N/4$ square switches if said largest prime factor equals two or if said largest prime factor equals three and N is even and divisible by four and comprises $N/6$ if said largest prime factor equals three and N is even and not divisible by four, each of said switches including $k$ inlets and $k$ outlets.

4. A distribution network comprising N input and N output terminals, where N is any positive integer such that $2^{\alpha_2}\cdot 3^{\alpha_3}\ldots k^{\alpha_k}$ is the prime decomposition of N into a product of prime factors raised to integer exponents, and S switching stages serially connected between said input and said output terminals, where S equals $$2\left(\sum_{j=2}^{k}\alpha_j\right)-1$$

if the largest prime factor of N equals three and N is odd or if said largest prime factor is greater than three, and equals $$2\left(\sum_{j=2}^{k}\alpha_j\right)-3$$

if said largest prime factor equals three and N is even or if said largest prime factor equals two.

5. A combination as in claim 4, wherein each of said switching stages includes a plurality of square switches each equal in size to every other switch in said corresponding switching stage.

6. A combination as in claim 5, wherein each of said square switches comprises a plurality of inlets, a like plurality of outlets, and a plurality of switching means connecting each of said inlets to each of said outlets.

7. A combination as in claim 6 further comprising a plurality of junctors respectively connecting said outlets included on each square switch included in a given switching stage with said inlets included on different square switches included in the following switching stage.

8. A distribution network comprising N input and N output terminals, where N is any positive integer such that $2^{\alpha_2}\cdot 3^{\alpha_3}\ldots k^{\alpha_k}$ is the prime decomposition of N into a product of prime factors raised to integer exponents, a plurality of switching stages serially connected between said input and output terminals, each of said stages including a plurality of square switches, said square switches included in any given noncentral switching stage being of a like size corresponding to an associated prime factor of N.

9. A combination as in claim 8, wherein each of said square switches comprises a plurality of inlets, a like plurality of outlets, and a plurality of switching means connecting each of said inlets to each of said outlets.

References Cited

UNITED STATES PATENTS

| | | | |
|---|---|---|---|
| 3,172,087 | 3/1965 | Durgin | 340—166 X |
| 3,201,520 | 8/1965 | Bereznak | 340—166 X |
| 3,223,978 | 12/1965 | Johnson | 340—166 |

THOMAS B. HABECKER, *Acting Primary Examiner.*

NEIL C. READ, *Examiner.*

H. I. PITTS, *Assistant Examiner.*